United States Patent [19]

Harris

[11] Patent Number: 4,715,618
[45] Date of Patent: Dec. 29, 1987

[54] VEHICLE SAFETY HARNESS FOR PETS

[76] Inventor: Garry L. Harris, 5250 S. Hardy Dr., Tempe, Ariz. 85283

[21] Appl. No.: 937,700

[22] Filed: Dec. 4, 1986

[51] Int. Cl.⁴ .......................................... B60R 22/00
[52] U.S. Cl. .................................... 280/801; 119/96; 280/748
[58] Field of Search .................. 280/801, 808, 748; 119/96, 143; 54/79

[56] References Cited

U.S. PATENT DOCUMENTS

| | | | |
|---|---|---|---|
| 3,310,034 | 3/1967 | Dishart | 119/96 |
| 3,524,679 | 8/1970 | De Lavenne | 280/748 |
| 4,292,932 | 10/1981 | Wooderson | 280/801 |
| 4,324,204 | 4/1982 | Friedman | 119/96 |
| 4,537,154 | 8/1985 | Kay | 119/96 |

Primary Examiner—John J. Love
Assistant Examiner—Kenneth R. Rice
Attorney, Agent, or Firm—Edward W. Hughes

[57] ABSTRACT

A safety harness for restraining a pet in an automotive vehicle includes a fabric jacket having a closed bottom portion for covering the chest and forequarters of the pet, and an open top portion. Adjustable belts extend across the front and rear of the open top portion for securing the jacket on the animal's body. In addition, a pair of detachable and preferably adjustable straps extend diagonally across the animal's back from the sides of the fabric jacket to fasten elements located on the vehicle floor or other rigid structure.

15 Claims, 4 Drawing Figures

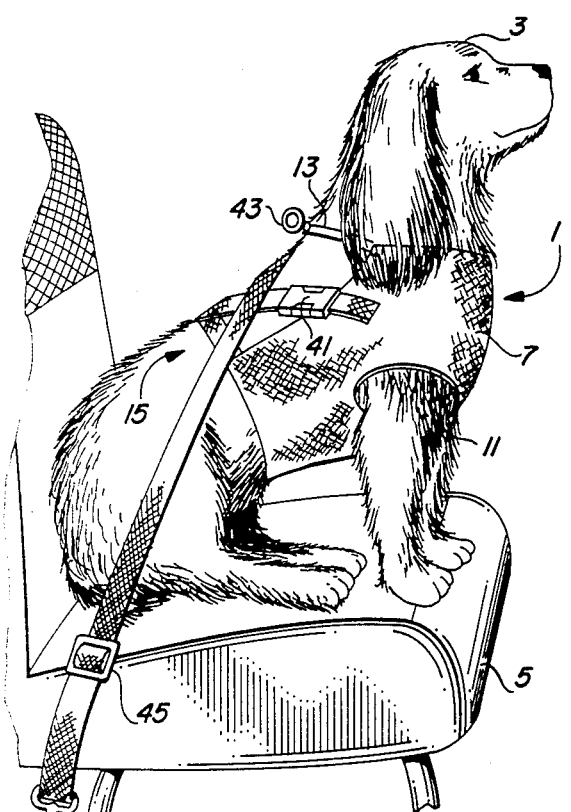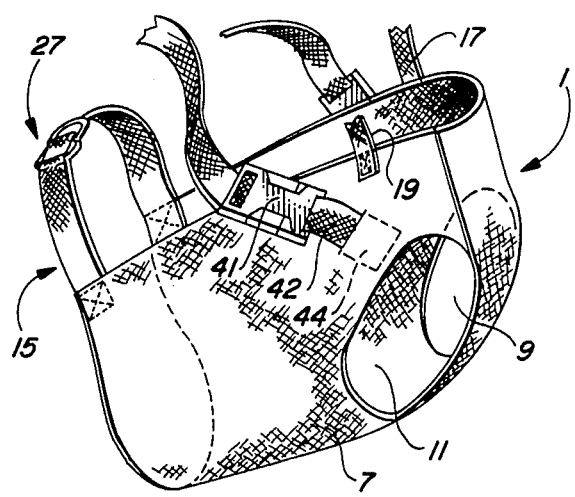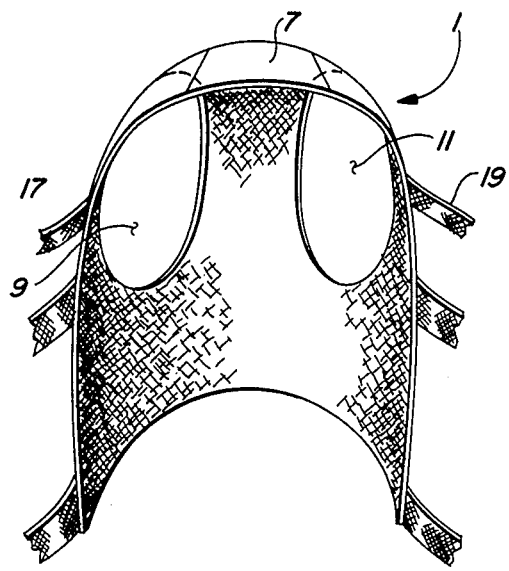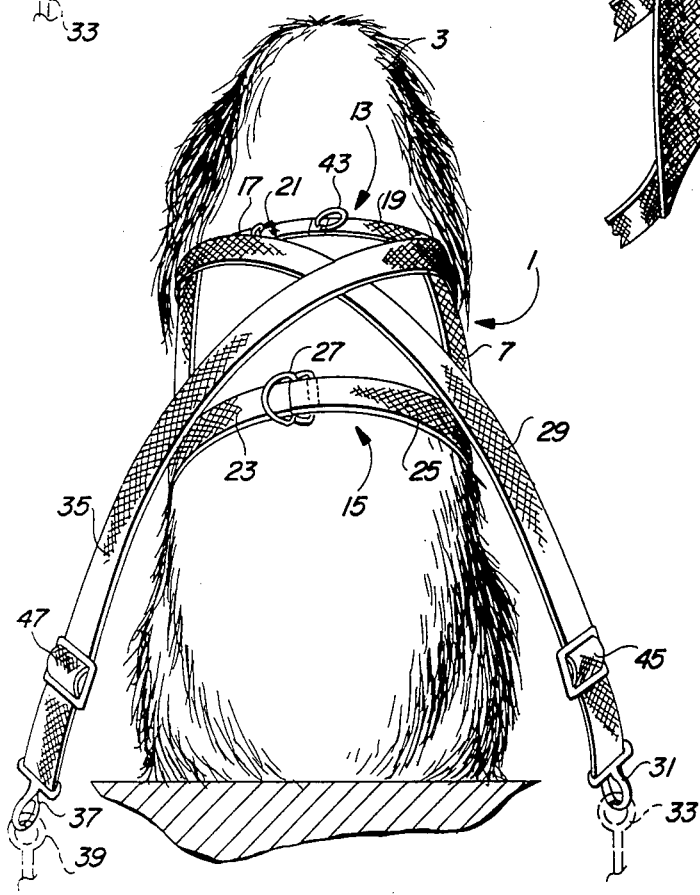

VEHICLE SAFETY HARNESS FOR PETS

BACKGROUND OF THE INVENTION

1. Field of the Invention

This invention relates in general to pet accessories and, more particularly, to a safety harness for restraining small animals such as dogs in automotive vehicles.

2. Background of the Prior Art

Much attention has been paid in recent years to the problem of safely and securely restraining the occupants of motor vehicles to prevent the occupants from being projected into the dashboard and front window or from being thrown out of the vehicle in the event of sudden stops, sharp turns, or accidents. This has resulted in the development of numerous safety products such as improved seat belts, air bags, and child safety seats, and in the passage of various regulations such as mandatory seat belt laws.

Very little has been done, however, with respect to the problem of animal safety in motor vehicles. As a result, many people traveling with dogs or cats leave their pets loose in the car or in the bed of a pick-up truck. Such practices are risky because they leave the animal vulnerable to injury when the vehicle suddenly accelerates, decelerates, turns, or is involved in an automobile accident. Consequently, according to Humane Society records, more than 200,000 dogs are killed or injured annually as a result of accidents experienced in pick-up trucks alone.

One prior art animal restraint device is disclosed in U.S. Pat. No. 4,292,932 to Wooderson. However, the Wooderson device consists simply of a tether which is adapted to be anchored between a door and a door jamb of an automobile and is only intended to prevent a pet from wandering about the vehicle and disturbing the driver. It does not protect the animal in the event of an accident. Furthermore, the device is effective only as long as the vehicle door remains closed.

Other animal harnesses are available on the market, but like the Wooderson device, they generally consist of a single tether with attachment means, and thus provides only limited restraint of the animal's motion.

A need exists, therefore, for a new and improved pet safety harness which overcomes the problems and shortcomings of the prior art.

SUMMARY OF THE INVENTION

In accordance with the present invention, a new and improved pet safety harness is disclosed. The harness comprises a jacket including a fore portion for covering the chest and forequarters of a small animal, and an open top portion. Adjustable belt means extend across the front and rear of the open top portion for securing the jacket on the animal's body. In addition, a pair of criss-crossed straps extend diagonally across the animal's back from the sides of the fabric jacket to connector elements located on the vehicle floor or other rigid structure. Preferably, the straps are adjustable to accommodate different sizes of pets and to allow different degrees of freedom for pets of differing temperaments and behavior characteristics.

Therefore, it is an object of this invention to provide a safety harness for pets which fully sand safely restrains the animal in the event of accidents or sudden changes in vehicle motion.

Another object of the invention is to provide a safety harness which is comfortable and adjustable to accommodate different sizes and types of pets.

Still another object of the invention is to provide a safety harness which is easy to install in a vehicle and to fit over the chest and legs of a relatively small animal such as a dog or cat.

The foregoing and other objects of the present invention as well as the invention itself, may be more fully understood from the following description when read in conjunction with the accompanying drawings.

BRIEF DESCRIPTION OF THE DRAWINGS

FIG. 1 is a perspective view showing a dog harnessed by means of the invention to the seat of an automotive vehicle.

FIG. 2 is a perspective view from the side of the safety harness of the present invention, with the front belt and cross straps broken away for clarity.

FIG. 3 is a perspective view from behind of the safety harness, with the front and rear belts and cross straps broken away.

FIG. 4 is a perspective view from behind of a dog wearing the harness of the present invention.

DESCRIPTION OF THE PREFERRED EMBODIMENT

Referring more particularly to the drawings, FIG. 1 shows the harness of the present invention, generally indicated by the numeral 1, used to restrain a pet such as a dog 3 in the seat 5 of an automotive vehicle. It should be noted, however, that the device is not limited to use with a seat 5, but may also be used to restrain animals on the floor of an automobile, in the bed of a pick-up truck or in any other convenient location in or on a vehicle.

The harness 1, comprises a jacket 7 which is essentially an inverted vest having a closed bottom portion which extends from just forward of the animal's rear legs to the middle of the animal's chest or neck the fore portion of jacket 7, and includes two openings 9, 11 for receiving the animal's front legs. The top portion of the jacket 7 is essentially open, with the exception of adjustable belt means for securing the jacket on the animal's body.

The belt means preferably comprises a pair of belts, with a first, or front belt 13 extending from the sides of the jacket 7 proximate the base of the neck of the animal for securing the front portion of the jacket 7 about the animal's rib cage, and a second, or rear, belt 15 extending from the sides of the jacket just forward of the animal's hindquarters for securing the back part of the jacket about the animal's mid-portion. Front belt 13 consists of a belt half 17 extending from one side of the jacket, and a belt half 19 extending from the opposite side of the jacket, and adjustable fastening means 21 for securing the first and second belt halves to one another. Similarly, rear belt 15 consists of first and second belt halves 23, 25 and adjustable fastening means 27 for securing the halves together. Any type of conventional adjustable fastener such as a buckle, clasp, or pair of D-rings attached to the end of one of the belt halves may be used for fastening means 21, 27.

In addition to belts 13 and 15, the jacket 7 is provided with criss-crossed strap means for anchoring the harness to a rigid structure such as the vehicle frame or floor. The strap means consists of a first diagonally extending strap 29 having one end connected to the left side of the jacket and a clasp 31 on its opposite end for detachably engaging a fastener element such as an eyebolt 33 mounted to the right of the animal, and a second strap 35 having one end connected to the right side of the jacket and a clasp 37 at its opposite end for detachably engaging another fastener element 39 mounted to the left of the animal.

Each of the straps 29, 35 is preferably demountably connected to the jacket by means of a conventional releasable latch 41 such as, for instance, the latch described in U.S. Pat. Nos. 4,150,464 and 4,171,555 and marketed by the ITW Nexus Company of Elk Grove, Ill. Preferably each latch 41 is connected to a short strip of webbed material 42 which is stitched into a pocket 44 in the side of jacket, so that the ends of the strip 42 are prevented from fraying. The detachability of the straps 29, 35 makes it unnecessary to remove the entire jacket each time the pet leaves the vehicle. Instead, it is only necessary to remove the straps 29, 35 and leave the jacket 7 on the animal while it is being walked or exercised. In addition, in order to increase the jacket's usefulness as a walking or exercice jacket, it is desirable to provide a connector ring 43 on the front belt of the jacket 7, for releasably receiving an end of the pet's leash or tether.

Furthermore each of the straps 29, 35 may be provided with length adjustment means 45, 47 such as a buckle or clasp for altering the straps to accommodate pets of different sizes and/or temperaments. Even the same pet may need to have the straps adjusted from time to time; for instance, one length may be more comfortable while the pet lays down and sleeps in the car, and another length may be better while the pet sit up. Thus, length adjustment means 45, 47 allow the pet owner to alter the straps 29, 35 to conform to the pet's position and posture at a given time.

The pet safety harness 1 can be constructed from a variety of readily available and inexpensive materials. Preferably, the jacket is made from a rugged, durable fabric such as denim, with an optional lining (not shown) made from a softer material which will not chafe or burn the animal's hide. The belts 13, 15 and straps 29, and 35 should be constructed from a material having relatively great tensile strength, such as webbing made from nylon or other suitable synthetic materials.

While the principles of the invention have now been made clear in the illustrated embodiments, there wil be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What is claimed is:

1. A safety harness for restraining a pet in a predetermined location in an automotive vehicle having a rigid frame, said safety harness comprising:
    a jacket configured as an inverted vest having an essentially closed bottom portion for substantially enclosing the chest and forequarters of said pet, and an essentially open top portion;
    belt means extending across said essentially open top portion of said jacket for securing said jacket about said pet; and
    strap means for securing said jacket to the rigid frame of said vehicle, said strap means including a first strap having a first end a second end, first latch means for releasably attaching said first end of said first strap to the left side of said jacket, first anchoring means for releasably connecting said second end of said first strap to a portion of the rigid frame of said vehicle to the left of said predetermined location, a second strap having a first end and a second end, second latch means for releasably attaching said first end of said second strap to the right side of said jacket, and second anchoring means for releasably connecting the second end of said second strap to a portion of the rigid frame of said vehicle to the right of said predetermined location.

2. The safety harness of claim 1, in which belt means comprises a front belt for securing a front portion of said jacket about the neck of said pet, and a rear belt for securing a rear portion of said jacket about the mid-portion of said pet.

3. The safety harness of claim 2, in which said front belt comprises means for attaching a leash to said jacket.

4. The safety harness of claim 3, in which each of said belts comprises:
    a first belt half extending from the left side of said jacket;
    a second belt half extending from the right side of said jacket; and
    means for adjustably securing said first and second belt halves to one another.

5. The safety harness of claim 1, in which said strap means further comprises means for adjusting the length of each of said straps.

6. The safety harness of claim 1, in which said fabric jacket comprises leg holes for surrounding the forelegs of said pet.

7. A safety harness for restraining an animal in a predetermined location in an automotive vehicle having a rigid frame and a first fastener element mounted in said rigid frame at a location to the right of said predetermined location and a second fastener element mounted in said rigid frame at a location to the left of said predetermined location, said safety harness comprising:
    a jacket having a right side and a left side, and an essentially open top portion between said right side and said left side;
    adjustable-length belt means extending across said essentially open top portion of said jacket for securing said jacket about said pet;
    first strap means having latch means at one end for releasably connecting said first strap means to the left side of said jacket and clasp means at the opposite end for releasably connecting said first strap means to said first fastener element mounted in said vehicle;
    second strap means having latch means at one end for releasably connecting said second strap means to the right side of said jacket and clasp means at the end for releasably connecting said second strap means to said second fastener element mounted in said vehicle.

8. The safety harness of claim 7, further comprising means for adjusting the length of said first strap and said second strap.

9. The safety harness of claim 7, further comprising means for attaching a leash to said harness.

10. The safety harness of claim 7, in which said belt means comprises a front belt for securing a front portion of said jacket about the ribcage of said pet, and a rear belt for securing a rear portion of said jacket about the mid-portion of said pet.

11. The safety harness of claim 7, in which each of said belt means comprises:
    a first belt half extending from the left side of said jacket;
    a second belt half extending from the right side of said jacket; and
    means for adjustably securing said first and second belt halves to one another.

12. The safety harness of claim 7, in which said jacket is in the form of an inverted vest having an essentially closed bottom portion for covering the chest and forequarters of said animal and a pair of leg holes in said closed bottom portion for receiving the legs of said animal.

13. A safety harness for restraining a pet in a predetermined location in an automotive vehicle, said harness comprising:
    restraining jacket means having a closed bottom portion, a fore portion, left and right side portions, and an open top portion, for positioning the pet within the jacket with the pet's chest contacting the fore portion;
    belt means extending across the top portion of the restraining jacket means for securing the jacket means about the pet;
    first strap means having a pair of ends, one end of said first strap means being connected to the left portion of the jacket means for extending diagonally over the back of the pet positioned in the restraining jacket means, and the other end of the first strap means being connected to first anchoring means secured to a rigid portion of the vehicle, said first anchoring means being positioned on the right side of the jacket means; and
    second strap means having a pair of ends, one end of said second strap means being connected to the right portion of the jacket means for extending diagonally over the back of the pet positioned in the restraining jacket means, and the other end of said second strap means being connected to a second anchoring means secured to a rigid portion of the vehicle, said second anchoring means being positioned on the left side of the jacket means;
    said first and second strap means positioning the restraining jacket and the pet positioned in said jacket means so that deceleration of the vehicle will force the chest of the pet against the fore portion of the restraining jacket means.

14. A safety harness as defined in claim 13 in which the ends of the first and second strap means are connected to the restraining jacket means proximate the fore portion of the jacket means.

15. A safety harness as defined in claim 14 in which the anchoring means are positioned at or below a surface of the vehicle on which the pet is located.

* * * * *